United States Patent
Peng et al.

(10) Patent No.: US 9,529,485 B2
(45) Date of Patent: Dec. 27, 2016

(54) TRACE PATTERN FOR TOUCH-SENSING APPLICATION

(71) Applicant: Creator Technology B.V., Tilburg (NL)

(72) Inventors: Tao Peng, Starkville, MS (US);
Xiaoping Weng, Shanghai (CN);
Dangdang Shao, San Jose, CA (US);
Yingzhu(Eileen) Deng, San Jose, CA (US)

(73) Assignee: Creator Technology B.V., Tilburg (NL)

( * ) Notice: Subject to any disclaimer, the term of this patent is extended or adjusted under 35 U.S.C. 154(b) by 0 days.

(21) Appl. No.: 15/014,277

(22) Filed: Feb. 3, 2016

(65) Prior Publication Data

US 2016/0291728 A1    Oct. 6, 2016

Related U.S. Application Data (63) Continuation of application No. 13/008,014, filed on Jan. 18, 2011, now Pat. No. 9,405,408.

(60) Provisional application No. 61/295,599, filed on Jan. 15, 2010.

(51) Int. Cl.
G06F 3/045    (2006.01)
G06F 3/044    (2006.01)

(52) U.S. Cl.
CPC ...... *G06F 3/044* (2013.01); *G06F 2203/04111* (2013.01)

(58) Field of Classification Search
CPC .................................................. G06F 3/044
USPC ................... 345/173, 174; 324/658, 662
See application file for complete search history.

(56) References Cited

U.S. PATENT DOCUMENTS

| | | | |
|---|---|---|---|
| 8,269,744 B2* | 9/2012 | Agari | G06F 3/044 345/173 |
| 2008/0007534 A1* | 1/2008 | Peng | G06F 3/044 345/173 |
| 2008/0111795 A1* | 5/2008 | Bollinger | G06F 3/041 345/173 |

\* cited by examiner

*Primary Examiner* — Calvin C Ma (74) *Attorney, Agent, or Firm* — Jianq Chyun IP Office (57) ABSTRACT

One embodiment of a capacitive sensor array comprises a plurality of row sensor elements including a first row sensor element, a plurality of column sensor elements including a first column sensor element, and a plurality of unit cells, wherein a first unit cell contains an intersection between the first row sensor element and the first column sensor element, and wherein a ratio between 1) a boundary length between the first row sensor element and the first column sensor element within the first unit cell and 2) a perimeter of the first unit cell is greater than $\sqrt{2}/2$.

14 Claims, 12 Drawing Sheets

TRACE PATTERN FOR TOUCH-SENSING APPLICATION

RELATED APPLICATIONS

This application is a continuation of U.S. patent application Ser. No. 13/008,014, filed Jan. 18, 2011, which claims priority to U.S. Provisional Patent Application No. 61/295,599, filed on Jan. 15, 2010, both of which are incorporated by reference herein in their entirety.

TECHNICAL FIELD

This disclosure relates to the field of touch-sensors and, in particular, to trace patterns of elements in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Described herein is method and apparatus for detecting one or more contact locations at a touch-sensing surface including a capacitive sensor array. In one embodiment, a capacitive sensing system may be used to perform mutual capacitance measurements between sensor elements in the capacitive sensor array. An embodiment of a capacitive sensor array having a greater mutual capacitance between sensor elements and smaller self capacitance for each of the individual sensor elements than a conventional capacitive sensor array may be used to decrease signal disparity in the resulting signal.

In one embodiment, a mutual capacitance between two sensor elements may be increased by maximizing a boundary length between the adjacent edges of the sensor elements. Additionally, the self capacitance of each individual sensor element may be decreased by minimizing the area of the sensor element.

Figure 1:
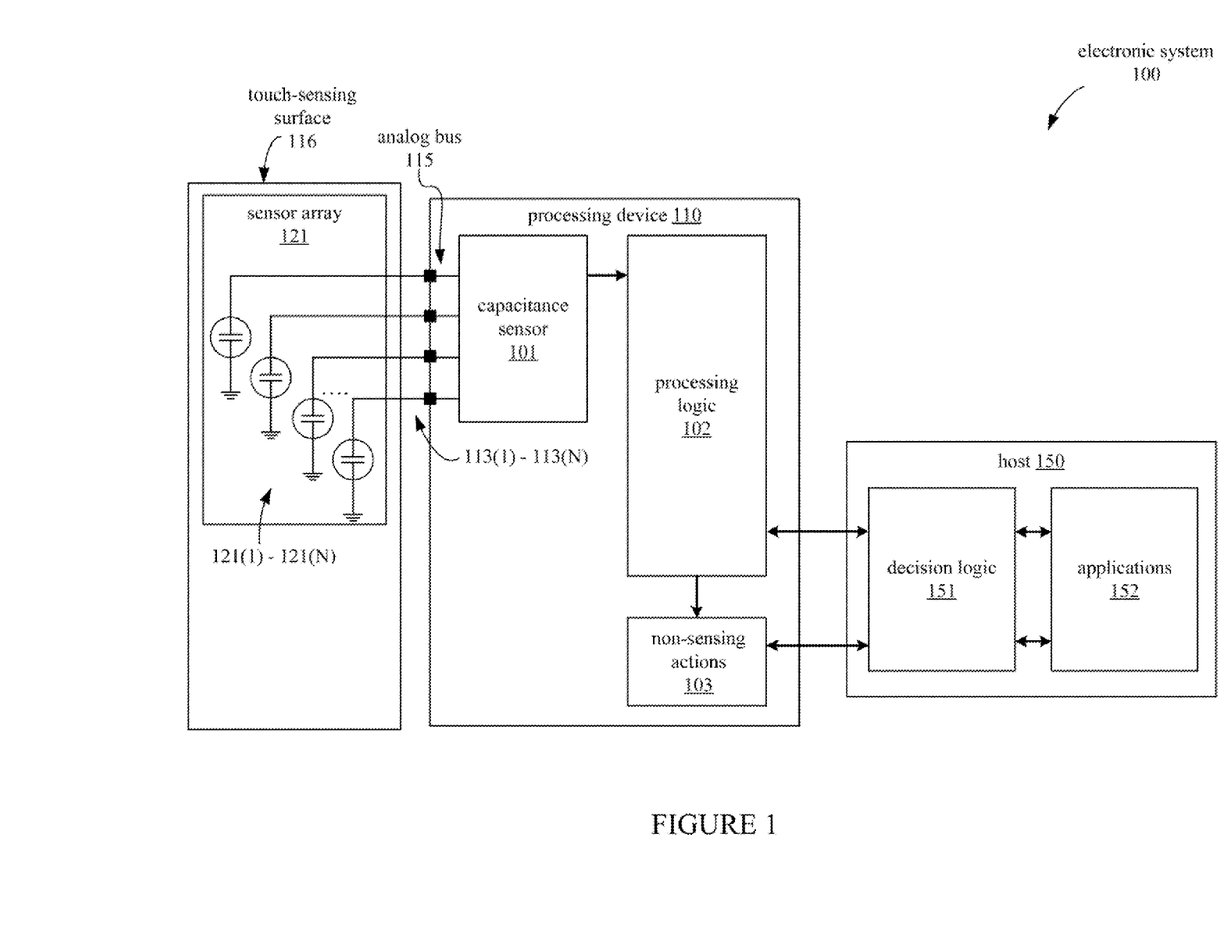
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object); tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
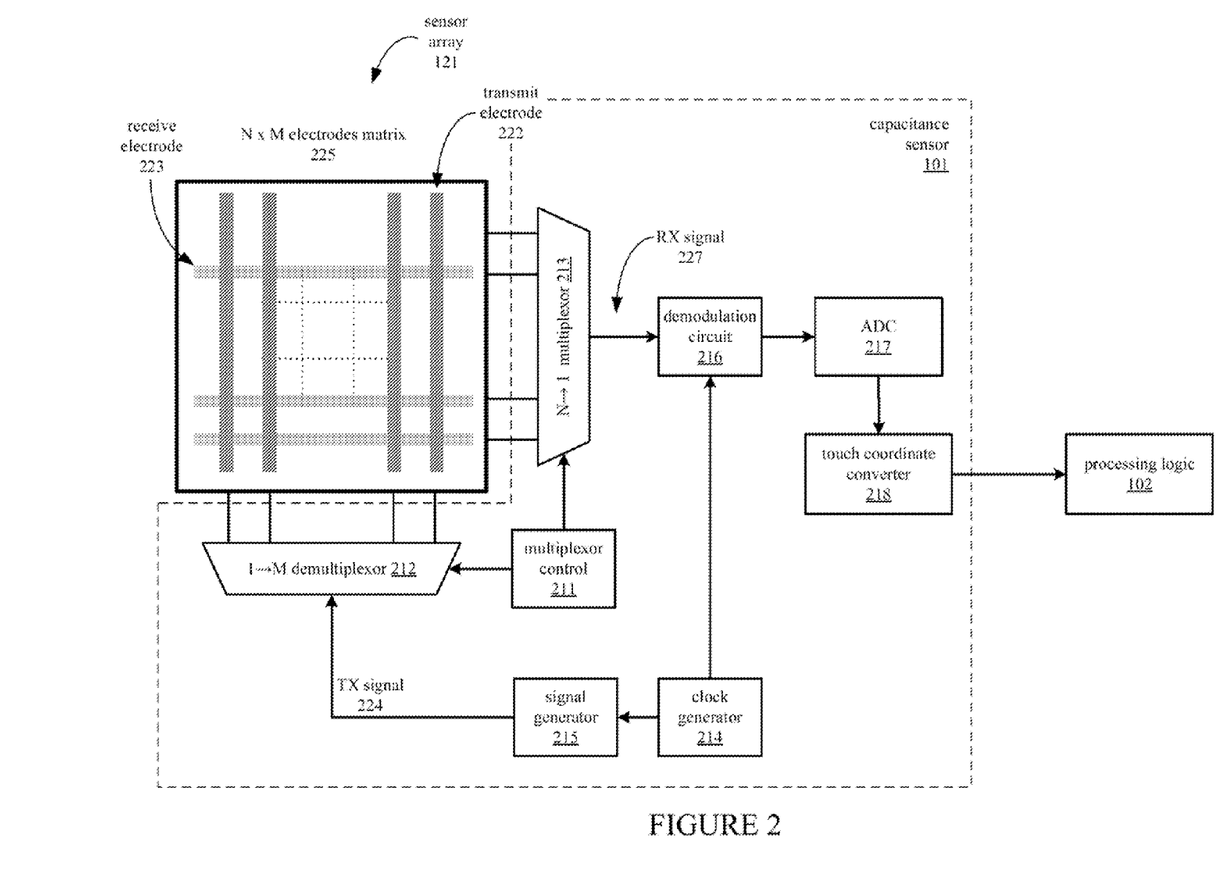
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, the sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 3A:
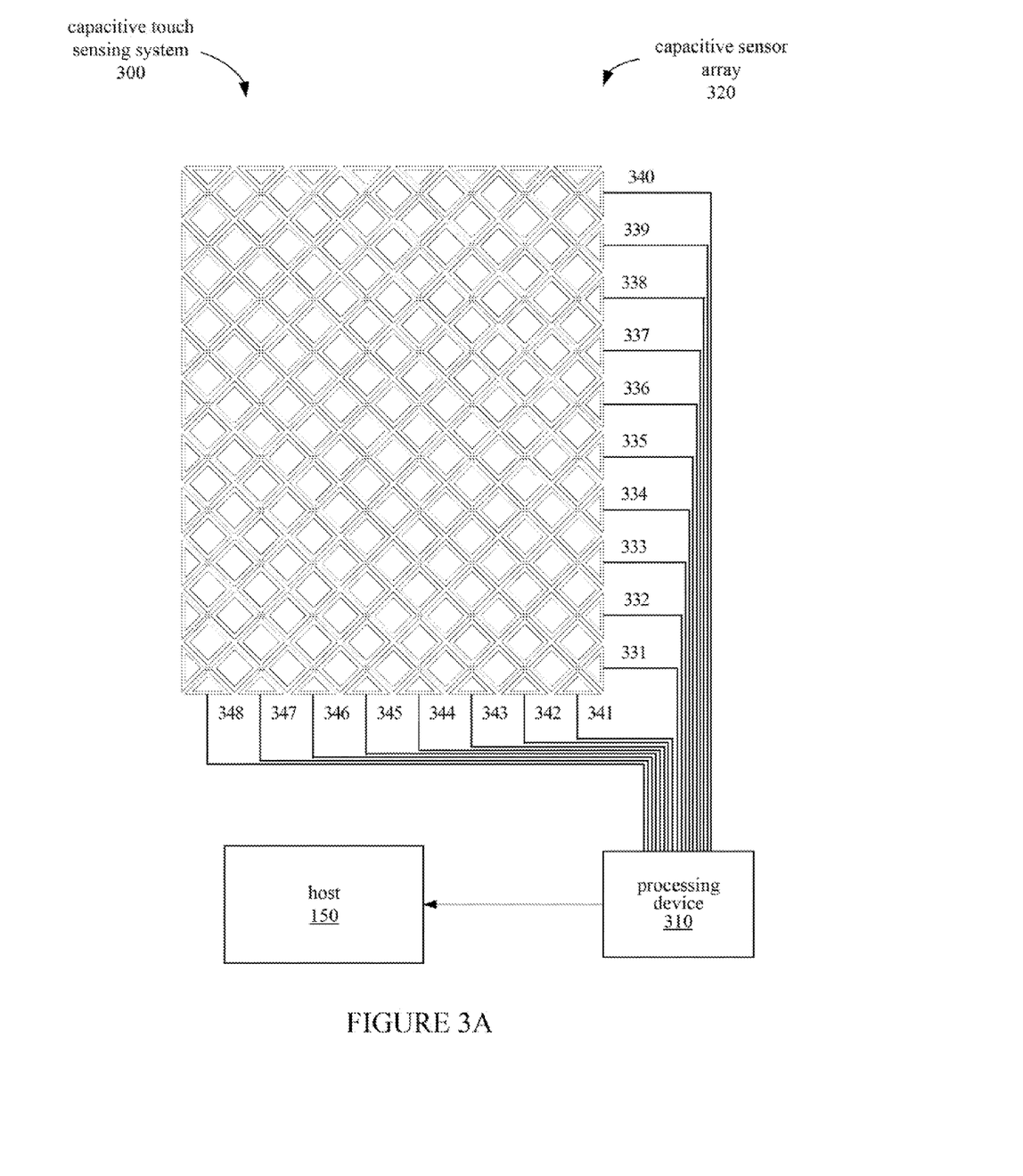
FIG. 3A illustrates an embodiment of a capacitive sensor array having a hollow diamond pattern.

FIG. 3A illustrates an embodiment of a capacitive touch sensing system 300 that includes a capacitive sensor array 320. Capacitive sensor array 320 includes a plurality of row sensor elements 331-340 and a plurality of column sensor elements 341-348. The row and column sensor elements 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor element and a column sensor element in the sensor array 320. The measured capacitances may be further processed to determine centroid locations of one or more contacts at the capacitive sensor array 320.

In one embodiment, the processing device 310 is connected to a host 150 which may receive the measured capacitances or calculated centroid locations from the processing device 310.

Figure 3B:
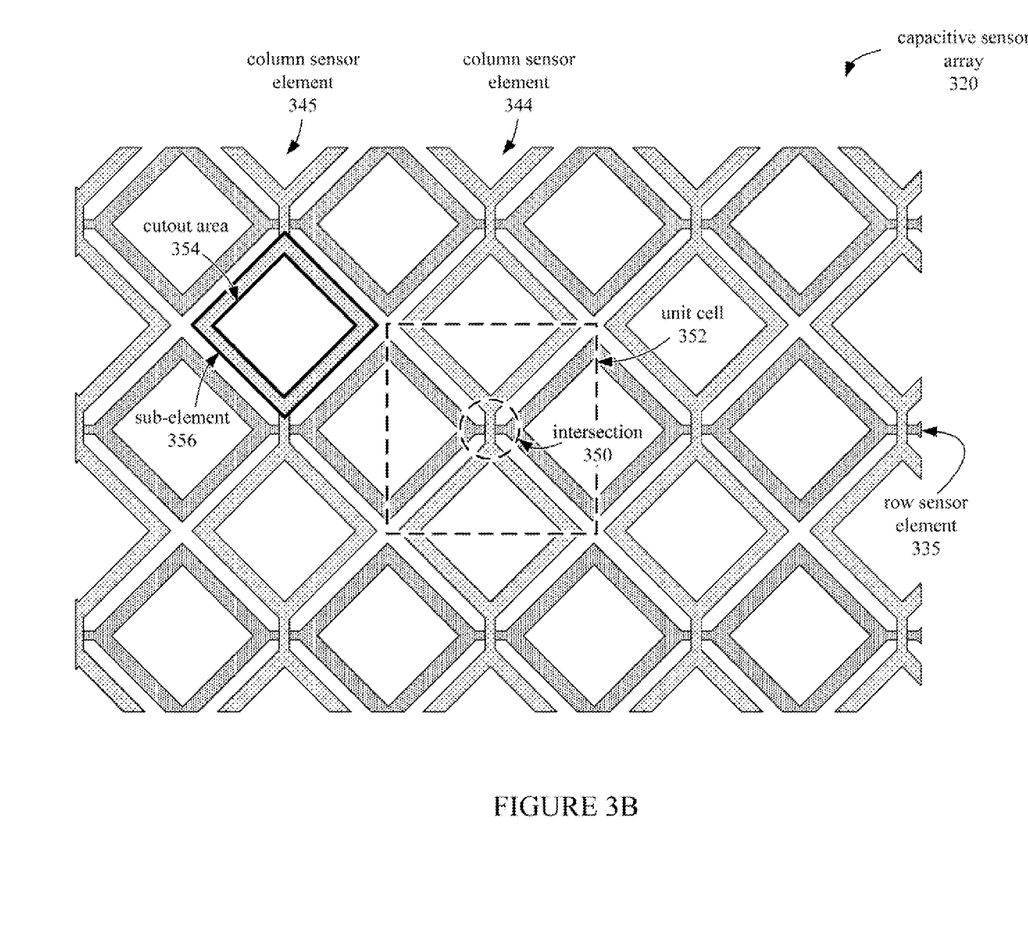
FIG. 3B illustrates an embodiment of a capacitive sensor array having a hollow diamond pattern.

FIG. 3B illustrates a closer view of capacitive sensor array 320. In one embodiment, the capacitive sensor array 320 has a hollow diamond pattern. Each of the sensor elements 331-348 in the sensor array 320 includes a number of sub-elements, and each of these sub-elements has a shape similar to a diamond, or a rotated square shape. Column sensor element 345, for example, includes a number of sub-elements such as sub-element 356. Each of the sub-elements also includes a cutout area to reduce the self capacitance of each of the sensor elements 331-348, as compared to a diamond patterned sensor element without cutout areas. For example, sub-element 356 includes a cutout area 354, which is an area of the sub-element 356 that lacks conductive material. In one embodiment, the cutout areas may be filled with conductive material or other material that is not electrically connected to their respective sensor elements.

FIG. 3B further illustrates an intersection 350 between column sensor element 344 and row sensor element 335. In one embodiment, unit cells of the capacitive sensor array 320 may designate areas of the capacitive sensor array 320 associated with a single intersection between a row sensor element and a column sensor element. For example, the unit cell 352 corresponds to intersection 350 between sensor elements 344 and 335.

In one embodiment, the trace pattern formed by the sensor elements within a unit cell is substantially similar to a trace pattern formed by sensor elements in each of the other unit cells. In one embodiment, the width of a unit cell may be approximately equal to the distance between corresponding features of adjacent unit cells. For example, the width of unit cell 352 may be approximately equal to the distance between intersection 350 and an adjacent intersection, such as the intersection between sensor element 345 and 335. In one embodiment, each unit cell is bounded by adjacent unit cells, such that there are no gaps between unit cells. For example, each unit cell may share its boundaries with unit cells associated with adjacent intersections.

Figure 3C:
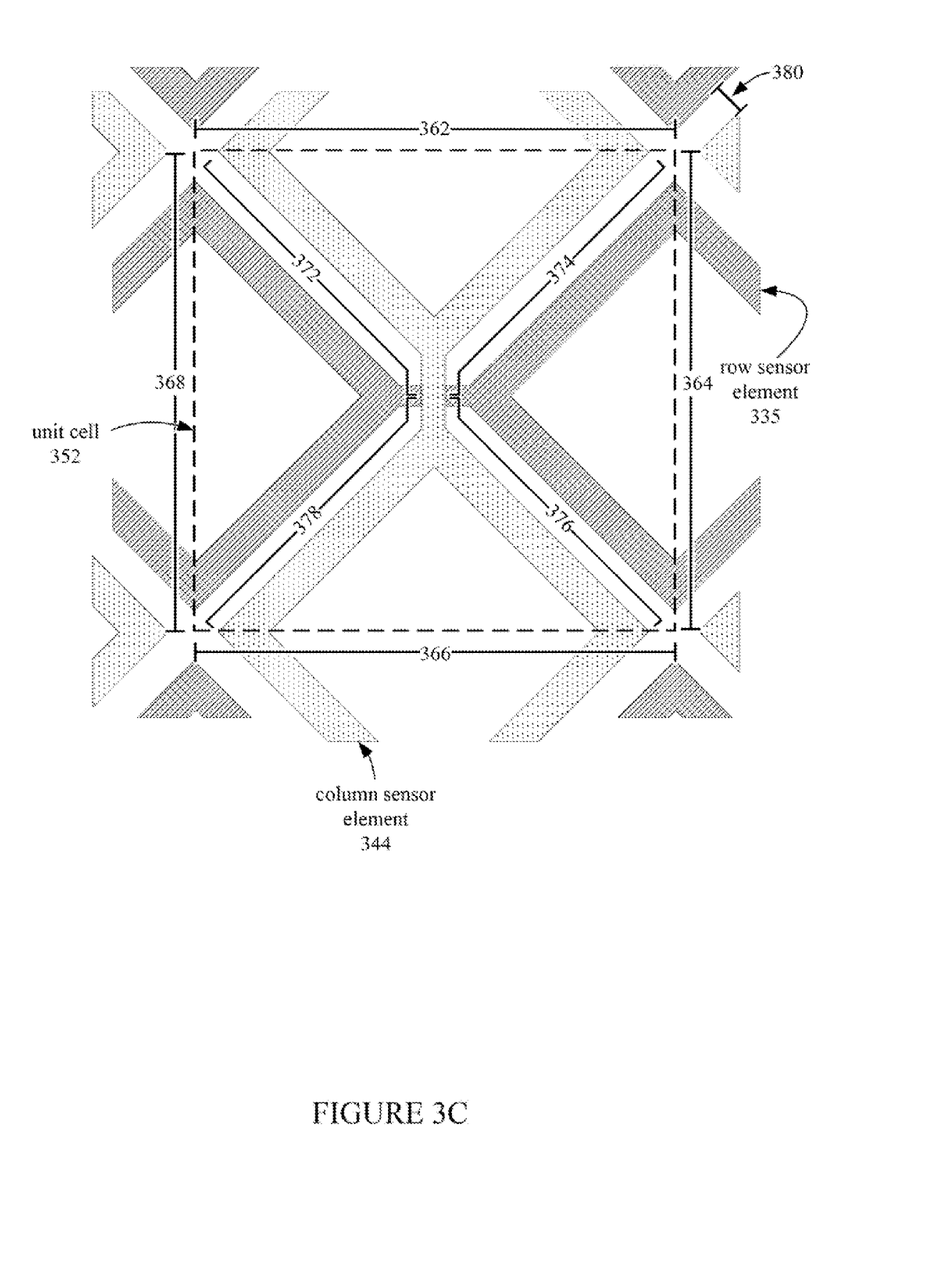
FIG. 3C illustrates an embodiment of a capacitive sensor array having a hollow diamond pattern.

FIG. 3C illustrates a detail view of unit cell 352, including the perimeter of unit cell 352 and boundary lengths between the row sensor element 335 and the column sensor element 344, according to an embodiment. In one embodiment, the boundary length between a first sensor element and a second sensor element may include the set of points within a unit cell and on an edge of the first sensor element from which a straight line can be drawn to reach an edge of the second sensor element without first crossing over any portion of the first sensor element.

As illustrated in FIG. 3C the boundary length between row sensor element 335 and column sensor element 344 includes the lengths of segments 372, 374, 376, and 378. Segments 372, 374, 376, and 378 mark the lengths of the edges of sensor element 335 from which a straight line can be drawn to an edge of sensor element 344 within unit cell 352 without first crossing sensor element 335.

Since drawing the straight lines from a row sensor element to a column sensor element may result in a different boundary length than drawing the lines from the same column sensor element to the row sensor element, the shorter of the two possible boundary lengths may be arbitrarily chosen as the total boundary length.

An alternative way to measure boundary length between a row sensor element and a column sensor element is to include all edge points of one sensor element that are within the unit cell and are also within a threshold distance from an edge of the other sensor element. For example, if the threshold distance is a radius R, the boundary length between row sensor element 335 and column sensor element 344 includes all the points on the edge of element 335 and within unit cell 352 that are less than the distance R from an edge of element 344. For example, if R is slightly greater than the length of segment 380, then the boundary length between sensor elements 335 and 344 includes the lengths of segments 372, 374, 376, and 378, since every point on the edges of sensor element 335 corresponding to these segments is within the distance R from an edge of sensor element 344. In one embodiment, R may be chosen so that the edges of the cutout areas such as cutout area 354 are not included in the boundary length.

In one embodiment, a ratio may be calculated between 1) the boundary length between the row sensor element 335 and the column sensor element 344 and 2) the perimeter of the unit cell 352. With regard to FIG. 3C, the perimeter of the unit cell 352 may be calculated by summing the lengths of segments 362, 364, 366, and 368, while the boundary lengths may be calculated by summing the segments 372, 374, 376, and 378. In one embodiment where the unit cell 352 is a square, each of the segments 362, 364, 366, and 368 measures 1 unit in length, such that each of the segments 372, 374, 376, and 378, measures less than $\sqrt{2}/2$ units in length. The total boundary length between the sensor elements 335 and 344 within unit cell 352 is therefore less than $4 \times \sqrt{2}/2$, or $2\sqrt{2}$ units in length. Since the perimeter of unit cell 352 is equal to 4 units, the ratio of the boundary length to the perimeter is less than $2\sqrt{2}/4$, or $\sqrt{2}/2$. Thus, the ratio of the boundary length to the unit cell perimeter for a hollow diamond pattern as illustrated in FIGS. 3A-3C is less than $\sqrt{2}/2$.

As compared to the hollow diamond pattern of the capacitive sensor array 320, a "dual hollow Manhattan" (DHM) rectangular pattern with subtraces and cutout areas may be used to increase the boundary length between the row and column sensor elements, to achieve a ratio of boundary length to unit cell perimeter that is greater than $\sqrt{2}/2$. In one embodiment, this may result in a decrease of 20% or more in the signal disparity ratio.

Figure 4A:
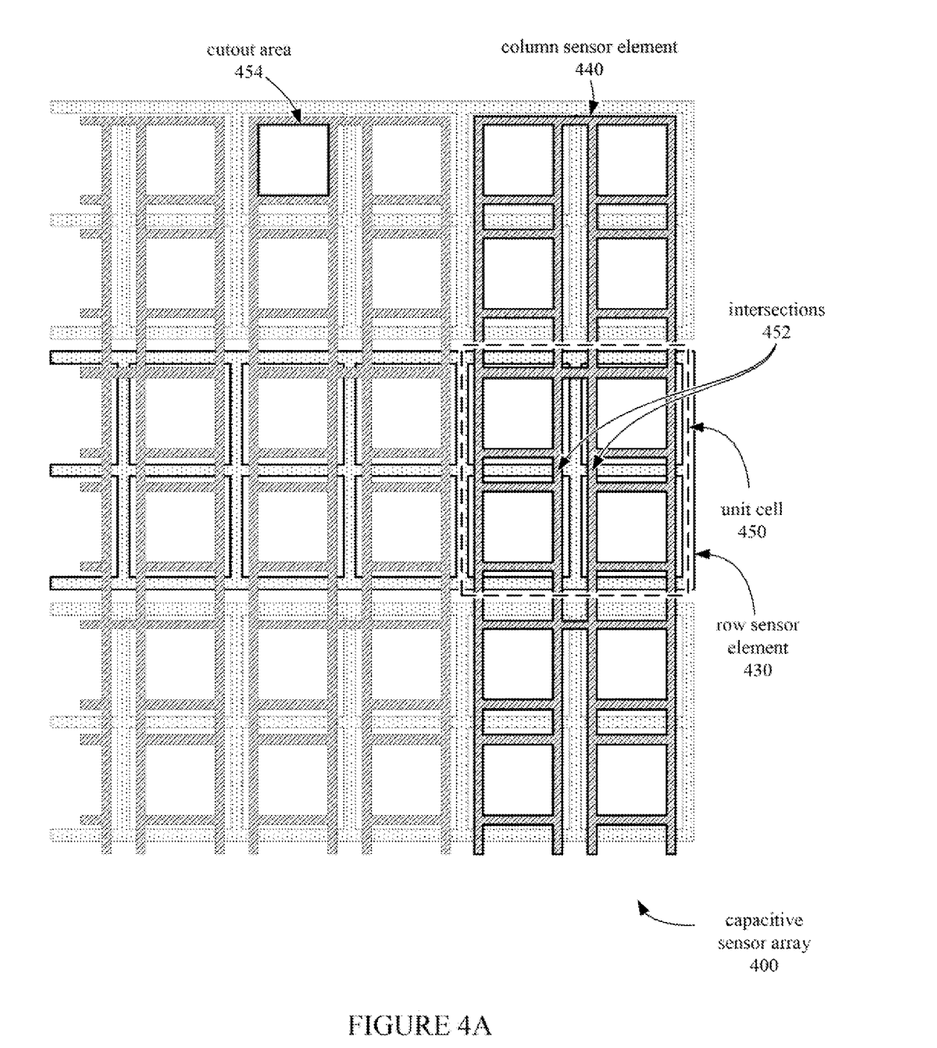
FIG. 4A illustrates an embodiment of a capacitive sensor array having a dual hollow Manhattan (DHM) pattern.

FIG. 4A illustrates a capacitive sensor array 400 having a DHM pattern. The unit cell 450 is associated with at least one intersection (such as intersections 452) between the row sensor element 430 and the column sensor element 440. In one embodiment, unit cell 450 may be defined as the largest contiguous area of the capacitive sensor array 400 that contains both the row sensor element 430 and the column sensor element 440 while excluding other sensor elements of the sensor array 400. In one embodiment, the size of unit cell 450 may be less than the largest such contiguous area so that the unit cell 450 may share its boundaries with adjacent unit cells. In one embodiment, such adjacent unit cells do not overlap. The DHM pattern also includes a number of cutout areas (such as cutout area 454) within each unit cell to minimize self capacitance of each sensor element. In one embodiment, each of the cutout areas of a row sensor element corresponds to a cutout area of a column sensor element. In one embodiment, such corresponding cutout areas may be concentric, so their boundaries are parallel.

The DHM pattern has an increased boundary ratio as compared to the hollow diamond pattern because the DHM pattern includes more edges of the row sensor element that are adjacent to edges of the column sensor element. The trace pattern within unit cell 450, for example, includes traces within the interior of the unit cell 450, as well as near the edges of the unit cell 450. Each of the edges of the row sensor element 430 within the unit cell 450 contributes to the total boundary length, except for the edges of the four larger cutout areas. Thus, the ratio of boundary length to unit cell perimeter is greater than $\sqrt{2}/2$ since (assuming a similarly sized unit cell) the sum of these lengths is greater than the sum of the segments 372, 374, 376, and 378 illustrated in FIG. 3C.

The relationship between boundary length and area of the unit cell for a DHM pattern can also be described by the following Equation 1:

$$\frac{L_B}{A_{CELL}} > 2\sqrt{2} \text{ units}^{-1} \qquad \text{(Equation 1)}$$

In Equation 1, $L_B$ represents the boundary length in units and $A_{CELL}$ represents an area of the unit cell in square units. Referring back to the hollow diamond pattern in FIG. 3C, if the length of each side of unit cell 352 is 1 unit, then the area $A_{CELL}$ of unit cell 352 is 1 square unit. Since boundary length $L_B$ is less than $2\sqrt{2}$ units in length, the value of $L_B/A_{CELL}$ is less than $2\sqrt{2}$ units$^{-1}$ for the hollow diamond pattern. In contrast, the value of $L_B/A_{CELL}$ for a DHM pattern is greater than $2\sqrt{2}$ units$^{-1}$ because of the additional boundary length between the row sensor element 430 and column sensor element 440.

Figure 4B:
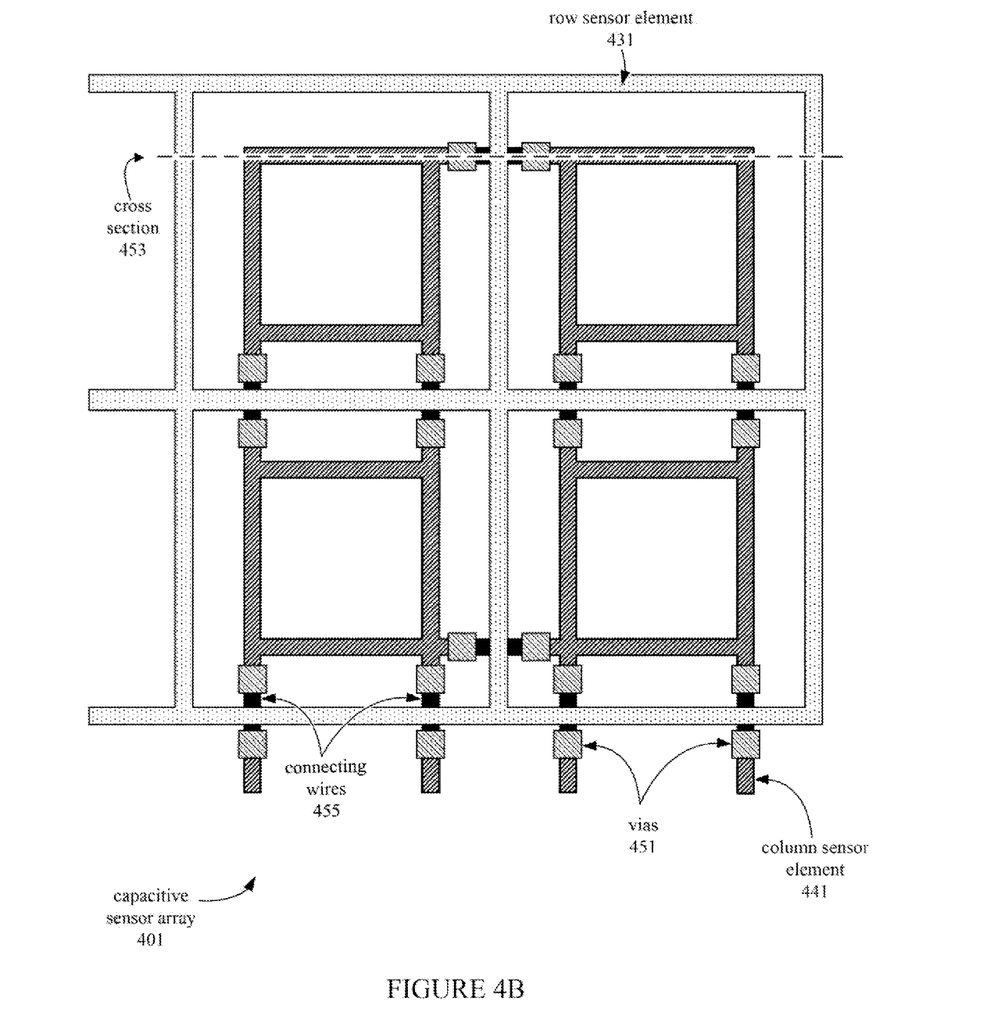
FIG. 4B illustrates an embodiment of a capacitive sensor array having a dual hollow Manhattan (DHM) pattern.

FIG. 43 illustrates a portion of a capacitive sensor array 401 having a DHM pattern formed by multiple layers of conductive material on a substrate, according to one embodiment. In one embodiment, the row sensor element 431 and pieces of the column sensor element 441 are situated in the same plane, while the connecting wires of the column sensor element 441 such as wires 455, which connect the other pieces of column sensor element 441, are situated in a different plane than the row sensor element 431 and the pieces of column sensor element 441 which they connect. Conductive elements in different planes may be connected by vias such as vias 451.

Figure 4C:
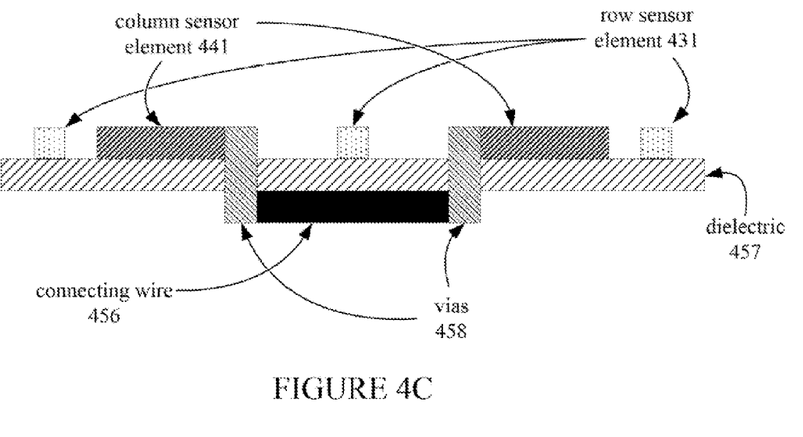
FIG. 4C illustrates a cross-section view of an embodiment of a capacitive sensor array having a dual hollow Manhattan (DHM) pattern.

FIG. 4C illustrates a cross-sectional view of capacitive sensor array 401 along the cross-section line 451, according to one embodiment. In one embodiment, row sensor element 431 and parts of column sensor element 441 are situated in the same plane, on one side of a dielectric material 457, while the connecting wire 456 of the column sensor element 441, which connects the other pieces of sensor element 441, resides on a different side of the dielectric 457. Vias 456 are used to connect the row sensor element 431 on one side of the dielectric 457 to the connecting wire 456 on the other side of the dielectric 457. In one embodiment, the dielectric is a substrate, such as a printed circuit board (PCB) substrate.

Figure 4D:
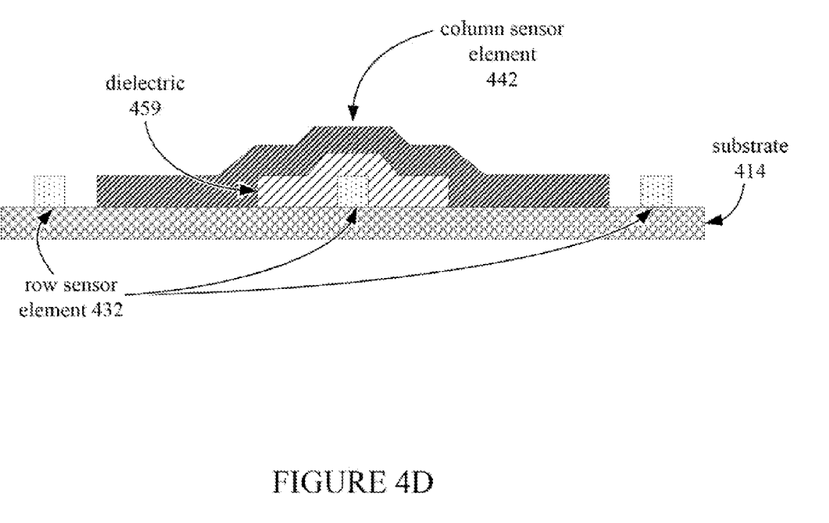
FIG. 4D illustrates a cross-section view of an embodiment of a capacitive sensor array having a dual hollow Manhattan (DHM) pattern.

FIG. 4D illustrates a cross-sectional view of an embodiment of a capacitive sensor array. In contrast with the capacitive sensor array illustrated in FIG. 4C, the column sensor element 442 may be a single printed trace that is situated over the dielectric material 459, which is in turn situated over the top of the row sensor element 432. In one embodiment, the dielectric 459 may be a printed dielectric, which is printed or otherwise deposited on top of the row sensor element 432 after sensor element 432 has been printed or deposited on the substrate 414. The column sensor element 442 may be printed or deposited on top of the dielectric 459 in one or more subsequent steps.

Figure 4E:
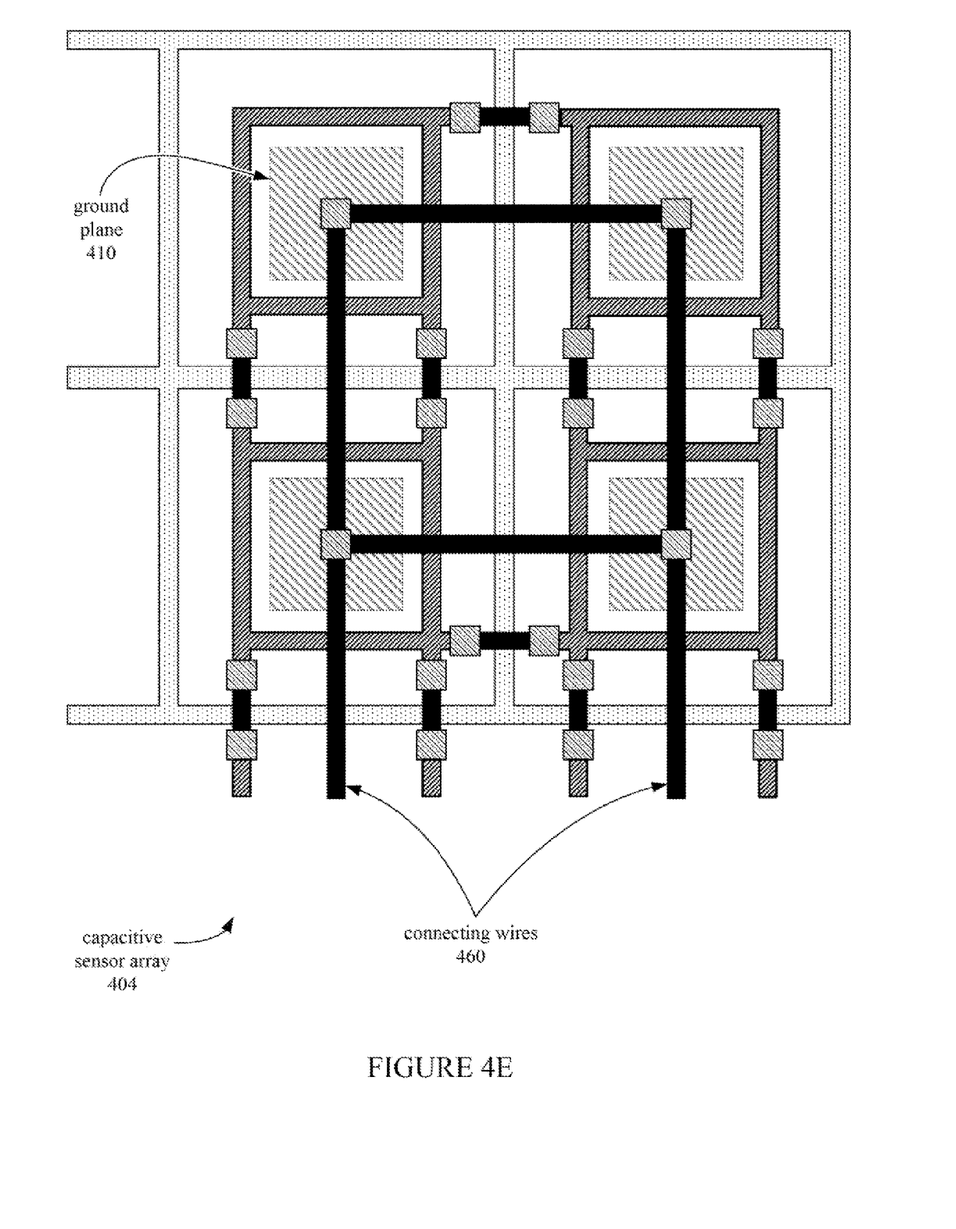
FIG. 4E illustrates an embodiment of a capacitive sensor array having a dual hollow Manhattan (DHM) pattern and ground planes.

FIG. 4E illustrates an embodiment of a capacitive sensor array 404 having a filled DHM pattern. In one embodiment, the cutout areas in the DHM pattern of sensor array 404 may be substantially filled with conductive material that is connected to ground, such as ground plane 410. In one embodiment, the ground plane 410 and other ground planes in the sensor array 404 may be connected to ground through one or more connecting wires 460. These connecting wires 460 may be situated on a different plane than the ground planes and the sensor elements, and may be connected to the ground planes through vias.

Figure 4F:
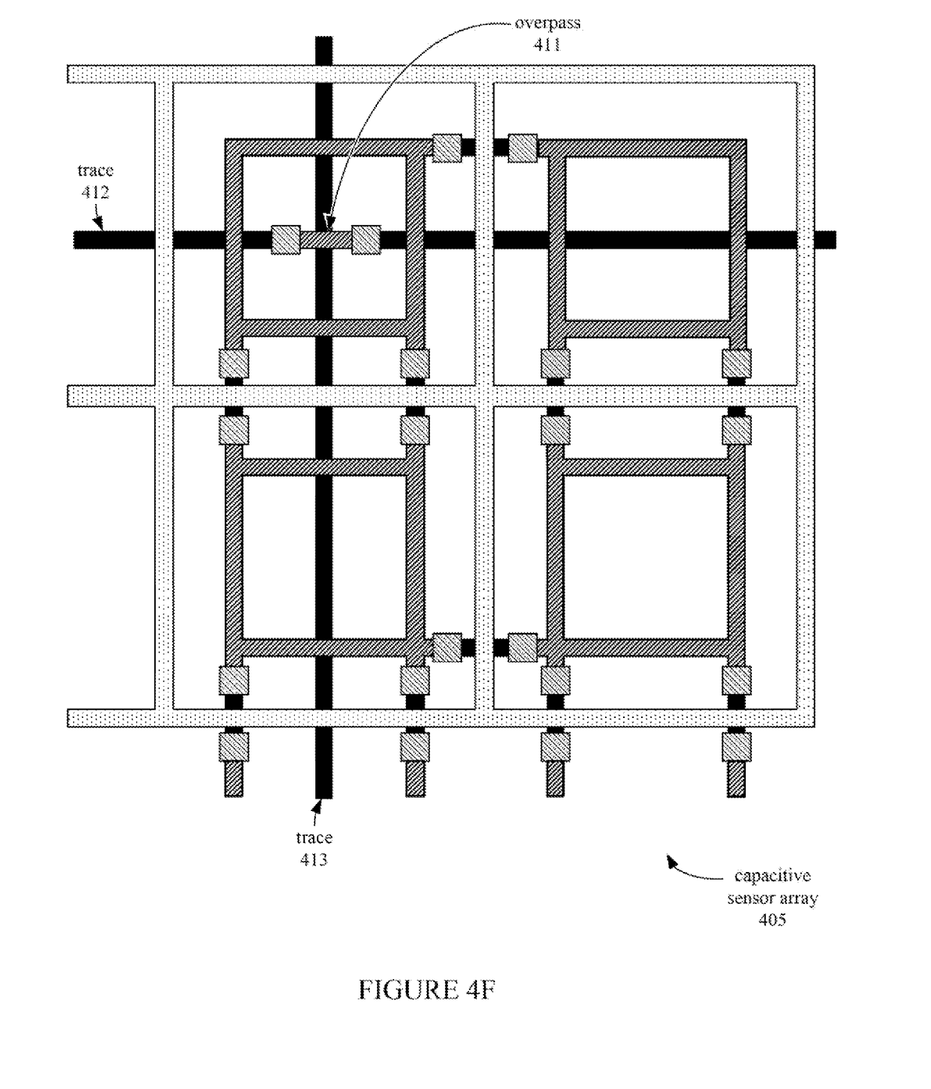
FIG. 4F illustrates an embodiment of a capacitive sensor array having a dual hollow Manhattan (DHM) pattern and additional traces.

FIG. 4F illustrates one embodiment of a capacitive sensor array 405 having a DHM pattern. In one embodiment, capacitive sensor array 405 may have additional circuitry on a lower side of its substrate, which may include conductive traces or wires such as traces 412 and 413. In one embodiment, the traces 412 and 413 may cross each other using an overpass segment 411 in a different plane than the traces 412 and 413. The overpass segment 411 may be, for example, in the same plane as the row and column sensor elements on the upper side of the substrate. In one embodiment, the overpass segment is connected to pieces of the trace 412 by one or more vies.

Figure 5:
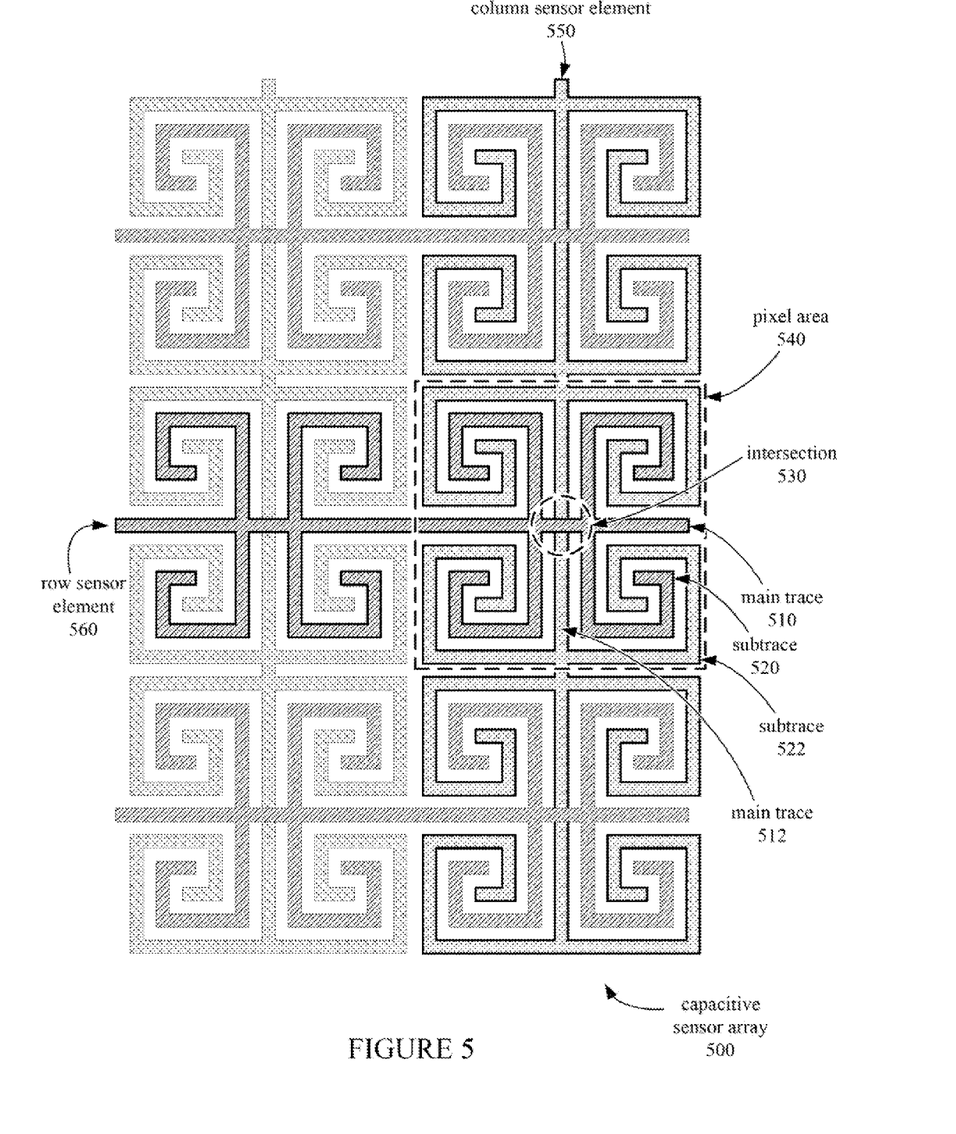
FIG. 5 illustrates an embodiment of a capacitive sensor array having a quad nested spiral pattern.

FIG. 5 illustrates a capacitive sensor array 500 having a quad spiral trace pattern, according to an embodiment. In one embodiment, the quad spiral trace pattern has a longer boundary length between row and column sensor elements than the hollow diamond pattern. For example, in sensor array 500, a row sensor element 560 may intersect with a column sensor element 550 at intersection 530, which is within the boundaries of unit cell 540. In one embodiment, row sensor element 560 includes a main trace 510 which extends for the full length of row sensor element 560. A number of traces, such as subtrace 520, may extend from the main trace 510.

Within unit cell 540, each of the subtraces of row sensor element 560 branching from the main trace 510 are followed by a corresponding subtrace of the column sensor element 550. In one embodiment, the subtraces of the column sensor element 550 may similarly branch from a main trace of the column sensor element 550. For example, the subtrace 520 branching from main trace 510 of the row sensor element 560 corresponds to the subtrace 522 branching from the main trace 512 of column sensor element 550. In one embodiment, the subtraces 520 and 522 form an interlocking spiral, thus increasing the boundary length between the subtraces 520 and 522. Additional subtraces within the unit cell 540 may be similarly patterned to further increase the boundary length between the row sensor element 560 and column sensor element 550.

The quad spiral pattern increases the boundary length between the row and column sensor elements such that the ratio of 1) the boundary length within a unit cell to 2) the perimeter of the unit cell is greater than the same ratio for a hollow diamond pattern. Thus, the ratio for the quad spiral pattern is greater than $\sqrt{2}/2$. Similarly, the ratio $L_B/A_{CELL}$ is greater than $2\sqrt{2}$ units$^{-1}$.

Figure 6:
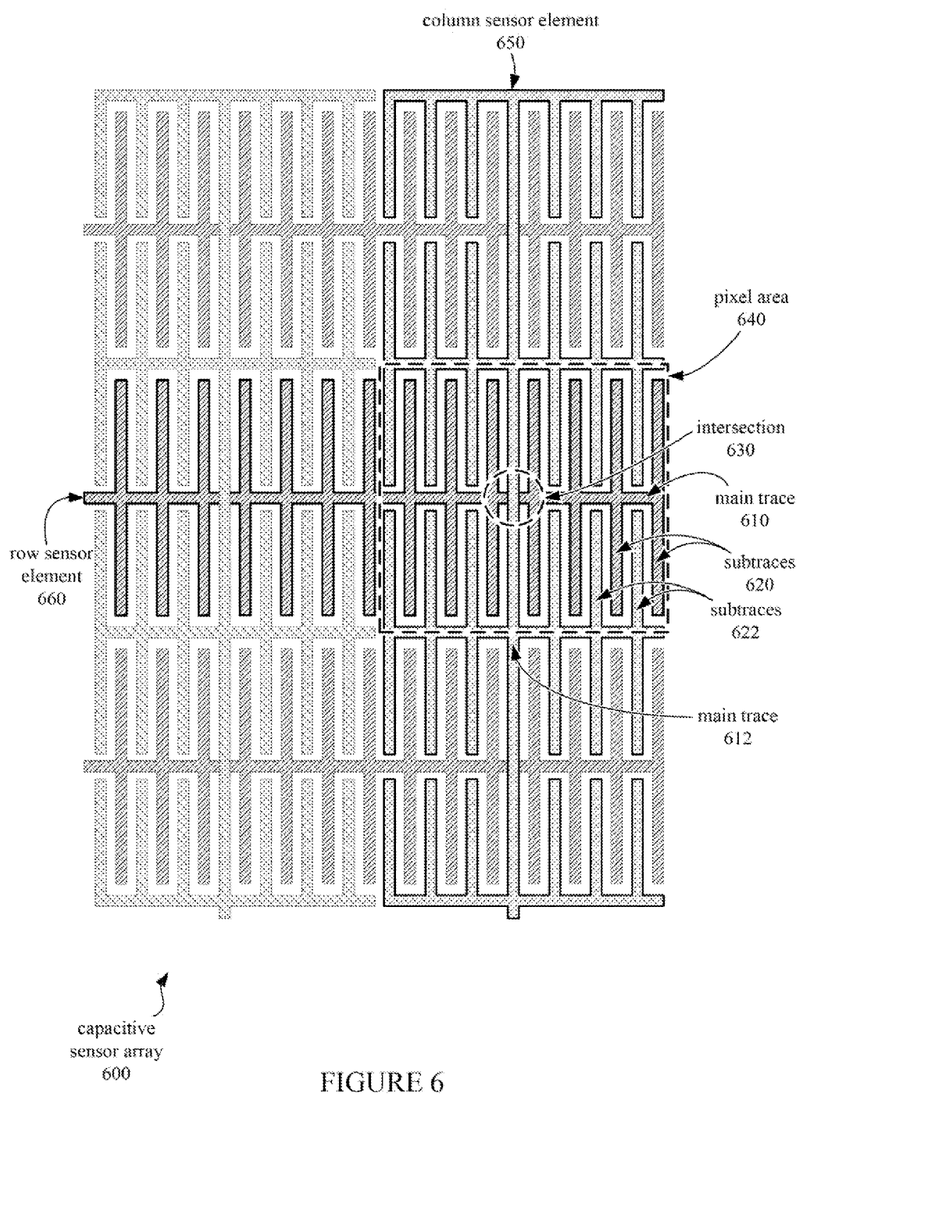
FIG. 6 illustrates an embodiment of a capacitive sensor array having a interleaved trace pattern.

FIG. 6 illustrates a capacitive sensor array 600 having interleaved traces, according to an embodiment. In capacitive sensor array 600, a unit cell 640 is associated with an intersection 630 between the row sensor element 660 and column sensor element 650. Row sensor element 660 includes a main trace 610 and a number of subtraces such as subtraces 620 branching from the main trace 610. Column sensor element 650 includes a main trace 612 and a number of subtraces 622 branching from the main trace 612. In one embodiment, the subtraces 620 of the row sensor element 660 are interleaved with the subtraces 612 of the column sensor element 650.

The interleaved pattern increases the boundary length between the row and column sensor elements such that the ratio of 1) the boundary length within a unit cell to 2) the perimeter of the unit cell is greater than the same ratio for a hollow diamond pattern. Thus, the ratio for the interleaved pattern is greater than $\sqrt{2}/2$. Similarly, the ratio $L_B/A_{CELL}$ is greater than 24 units$^{-1}$.

Those skilled in the art will recognize that, in addition to the DHM, quad spiral, and interleaved patterns, many other trace patterns may be used to increase the boundary length between row and column sensor elements of a capacitive sensor array without departing from the spirit and scope of the invention. Embodiments of such trace patterns may include features similar to those illustrated in FIGS. 4-6, such as row and column sensor elements with cutout areas, corresponding parallel subtraces, and thin traces filling the majority of each unit cell.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
a plurality of row sensor elements including a first row sensor element;
a plurality of column sensor elements including a first column sensor element; and
a plurality of unit cells, wherein each of the plurality of unit cells contains an intersection between one of the plurality of row sensor elements and one of the plurality of column sensor elements, and wherein a first unit cell contains a first intersection between the first row sensor element and the first column sensor element, wherein a ratio between 1) a boundary length between the first row sensor element and the first column sensor element within the first unit cell and 2) a perimeter of the first unit cell is greater than $\sqrt{2}/2$, wherein the first column sensor element includes at least a first cutout area, and wherein the first row sensor element includes at least a second cutout area overlapped with the corresponding first cutout area.

2. The capacitive sensor array of claim 1, wherein the boundary length includes points on an edge of the first row sensor element that are within the unit cell and are within a threshold distance from an edge of the first column sensor element.

3. The capacitive sensor array of claim 1, wherein the boundary length includes points on an edge of the first row sensor element from which a straight line can be drawn to an edge of the first column sensor element without first crossing over a portion of the first row sensor element.

4. The capacitive sensor array of claim 1, wherein a trace pattern formed by the first row sensor element and the first column sensor element within the first unit cell is substantially similar to a trace pattern of each of the other unit cells.

5. The capacitive sensor array of claim 1, wherein the width of each unit cell along a first axis is approximately equal to a distance between corresponding intersections along the first axis.

6. The capacitive sensor array of claim 1, wherein the unit cell is defined by a plurality of boundaries, and wherein each of the plurality of boundaries is a common boundary shared with a unit cell of an adjacent intersection.

7. The capacitive sensor array of claim 1, wherein the unit cell contains the first row sensor element and the first column sensor element while excluding all other sensor elements of the plurality of row sensor elements and the plurality of column sensor elements of the capacitive sensor array.

8. A capacitive sensor array, comprising:
a plurality of row sensor elements including a first row sensor element;
a plurality of column sensor elements including a first column sensor element; and
a plurality of unit cells, wherein each of the plurality of unit cells contains an intersection between one of the plurality of row sensor elements and one of the plurality of column sensor elements, and wherein a first unit cell contains a first intersection between the first row sensor element and the first column sensor element, wherein $$\frac{L_B}{A_{CELL}} > 2\sqrt{2} \text{ units}^{-1}$$

where $L_B$ represents the boundary length in units and $A_{CELL}$ represents an area of the unit cell in square units, wherein the first column sensor element includes at least a first cutout area, and wherein the first row sensor element includes at least a second cutout area overlapped with the corresponding first cutout area.

9. The capacitive sensor array of claim 8, wherein the boundary length includes points on an edge of the first row sensor element that are within the unit cell and are within a threshold distance from an edge of the first column sensor element.

10. The capacitive sensor array of claim 8, wherein a trace pattern formed by the first row sensor element and the first column sensor element within the first unit cell is substantially similar to a trace pattern of each of the other unit cells.

11. The capacitive sensor array of claim 8, wherein the unit cell contains the first row sensor element and the first column sensor element while excluding all other sensor elements of the plurality of row sensor elements and the plurality of column sensor elements of the capacitive sensor array.

12. A capacitive touch-sensing system, comprising:
a capacitive sensor array, comprising:
a row sensor element of a plurality of row sensor elements,
a column sensor element of a plurality of column sensor elements, and
a unit cell of a plurality of unit cells, wherein each of the plurality of unit cells contains an intersection between one of the plurality of row sensor elements and one of the plurality of column sensor elements, wherein the unit cell contains an intersection between the row sensor element and the column sensor element, and wherein a ratio between 1) a boundary length between the row sensor element and the column sensor element within the first unit cell and 2) a perimeter of the first unit cell is greater than $\sqrt{2}/2$; and a capacitance sensor coupled with the capacitive sensor array, wherein the capacitance sensor is configured to measure a mutual capacitance for each of the intersections, wherein the first column sensor element includes at least a first cutout area, and wherein the first row sensor element includes at least a second cutout area overlapped with the corresponding first cutout area.

13. The capacitive touch-sensing system of claim 12, wherein the capacitance sensor is further configured to calculate at least one centroid position of a contact at the touch-sensing surface based on the measured mutual capacitances.

14. The capacitive touch-sensing system of claim 12, wherein the boundary length includes points on an edge of the first row sensor element that are within the unit cell and are within a threshold distance from an edge of the first column sensor element.

* * * * *